Patented Nov. 14, 1922.

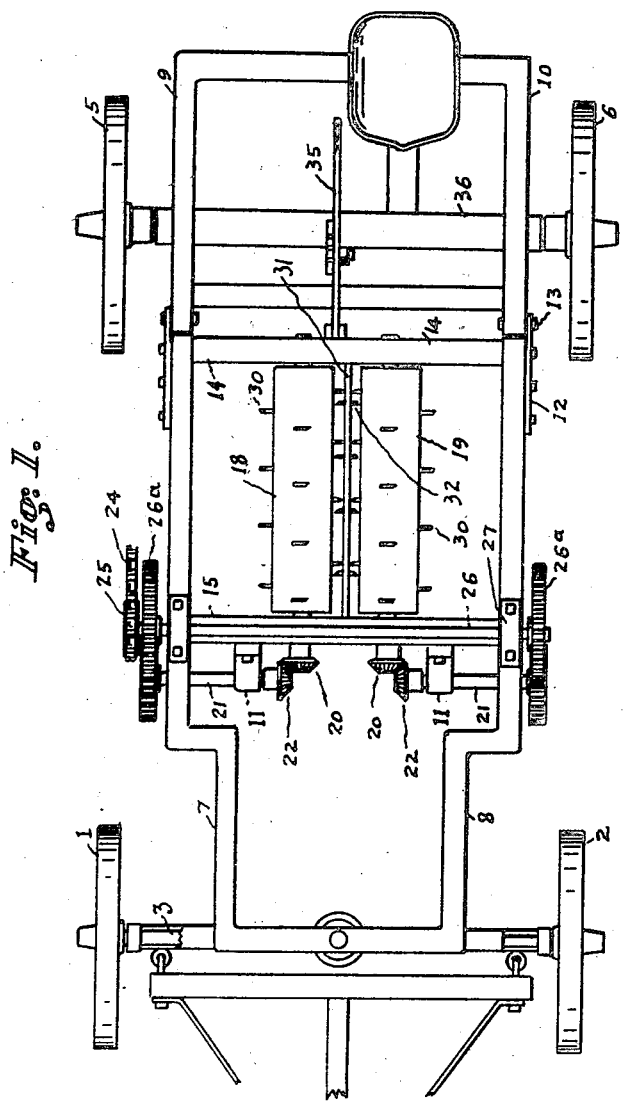

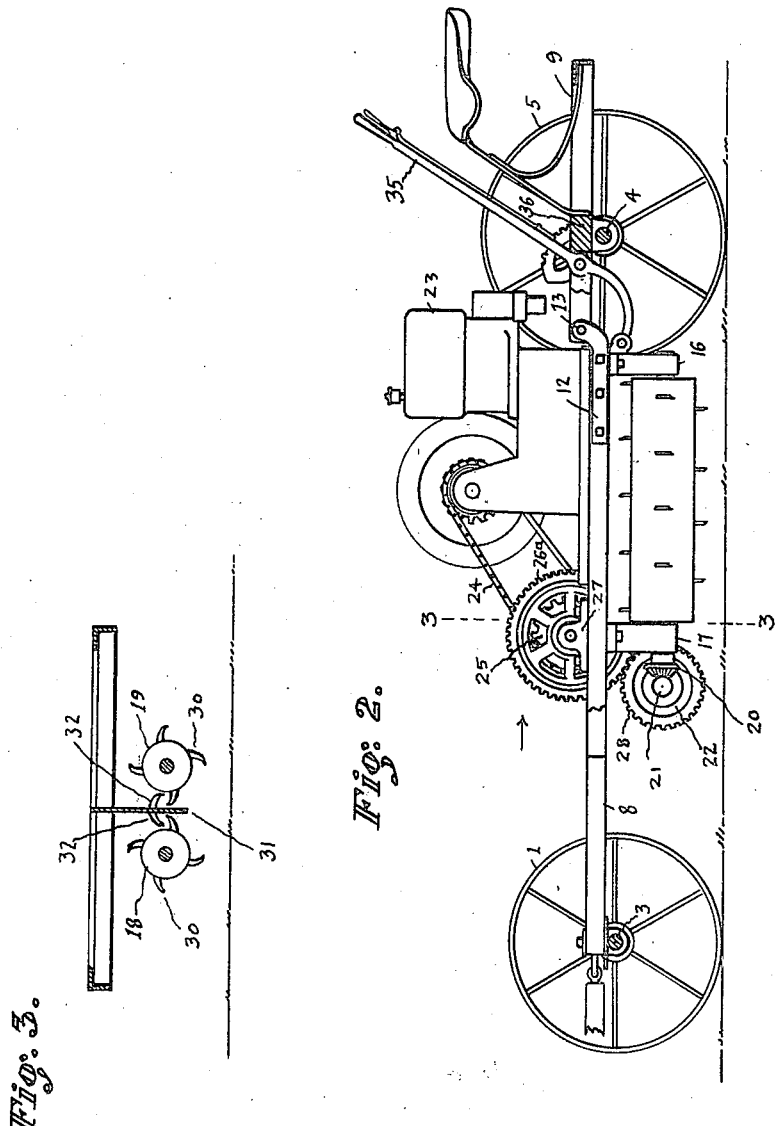

1,435,752

UNITED STATES PATENT OFFICE.

FREDERICK STIFFLER AND COLUMBUS STIFFLER, OF MUNCIE, INDIANA.

CORNSTALK BREAKER.

Application filed July 13, 1921. Serial No. 484,392.

*To all whom it may concern:*

Be it known that FREDERICK STIFFLER and COLUMBUS STIFFLER, citizens of the United States, residing at Muncie, in the county of Delaware and State of Indiana, have invented certain new and useful Improvements in Cornstalk Breakers, of which the following is a specification.

This invention relates to improvements in agricultural implements.

The effective disposition of the stalks of the corn field, so that the proper cultivation of the field may be had, has long been a problem. By reason of the fact that even when the stalks and stubble are uprooted and lying on the ground, it is impracticable to plow same under, there has arisen the necessity of a means to break up and disintegrate the stalks.

The objects of this invention are to provide a machine by the operation of which the standing stalks may be broken down, severed, and so shredded or disintegrated that the same may be readily plowed under and made a part of the soil.

The objects of our invention are accomplished by, and the invention is embodied in the new construction, combination and arrangement of parts shown in the annexed drawings and described in the appended claims.

In the drawings the several parts of the invention are identified by suitable characters of reference applied thereto in the different views, in which—

Figure 1 is a top plan view, and

Figure 2 is a side view of our invention, in the latter view, some of the parts being broken away.

Figure 3 is a transverse sectional view taken on the line 3—3 and seen in the direction indicated by the arrow in Figure 2.

This machine may be drawn by a team of horses. The front wheels 1 and 2 are journaled on a suitable axle shaft 3 which has the usual king bolt connection to the machine frame. The rear portion of the frame is suitably supported on an axle shaft 4 on whose ends are jornaled the wheels 5 and 6.

The machine frame may be made of steel angle bars 7 and 8, 9 and 10, and is of the general form shown in Figure 1, the offsets and the frontal end affording suitable clearance for the wheels 1 and 2 when the direction of the travel of the machine is other than straight ahead. The rear portion of the frame, supported on the rear axle bar, as shown, constitutes a support for the forward portion of the machine frame. By means of the bars 12 that are bolted to the frame sides 7 and 8, and which are loosely engaged on the studs 13 carried by the frame sides 9 and 10, a hinged joint in the frame is provided, the purpose of which will be presently referred to. On the undersides of the transverse frame bars 14 and 15 are journal blocks 16 and 17 in which are journaled the shaft ends of break or gathering rolls 18 and 19. On these shaft ends are bevel gear wheels 20 which mesh with gear wheels 22 which are secured to shafts 21 that are journaled in suitable boxings 11 supported by the frame member 15. Shaft 26 is journaled in boxings carried by the frame, and the motion of this shaft is transmitted by the gear wheels 26ª secured thereon, to the gear wheels 28 that are secured to the shafts 21.

On one end of the shaft 26 is secured a sprocket wheel 25. Power to drive the shaft 26 is supplied by an internal combustion engine 23 that is suitably fastened to the frame of the machine. Power from the engine may be transmitted from a sprocket wheel carried by its main shaft, by means of a chain belt 24.

It is apparent that by the foregoing construction and arrangement the driving power of the engine is so transmitted, that there is a rotation of the gathering rolls 18 and 19, and in opposite directions; and that the speed of the operation of said rolls may be varied by a variation in the speed of the engine, or by a variation of the gearing between the engine shaft and the driving shaft 26.

Arranged in staggered order on the faces of the rolls 18 and 19 are knives 30. Arranged to project from each side of a center bar 31 which is secured to the frame, are knives 32 which have such position with reference to the gathering rolls and their knives 30, that the stalks are drawn upwardly by the rotating rolls, and as so gathered and elevated, are cut to pieces in such manner that the stalks are split and chopped or broken up.

To render possible the raising and lowering of the gathering rolls, there is provided the hand lever 35. This hand lever which may be locked to different adjusted positions, is pivotally connected to the rear frame member 36, and its lower arm is connected to the frame member 14.

This machine besides being of simple and economical construction, is capable of easy manipulation. The operator, from his position on the seat, directs the travel of the machine down the corn field row. As the machine moves forwardly, the stalks having been broken down forwardly and being disposed at position near the ground, they are engaged by the knives 30 and are gathered and drawn upwardly where they are cut and broken, and split or shredded by the action of the knives 30, one after the other, coming into registration with the knives 32. The preferred form and degree of curvature of the body portions of the knives 30, are shown in Figure 2.

The operator, by handling the lever 35, is able to raise and lower the gathering rolls so that the undulations of the soil, and the varying character of the stalks, and the occasional presence of rocks or other objects to be avoided, may be so allowed for, that there is at all times maintained the maximum efficiency of the gathering and breaking rolls, and the work of the machine may be uninterrupted. By reason of the peculiar form of the frontal portion of the machine frame, turning of the machine at the termination of the corn stalk row, and at the beginning of the adjacent row, is easy.

Claims:

1. A machine of the kind described, comprising a frame, traction wheels for the frame, gathering rolls arranged longitudinally of the frame and having hook shaped knives projecting from their surfaces, a vertical longitudinal central member carried by the frame, knives projecting from said central member at positions alternate with the positions of the knives carried by the gathering rolls, a driving shaft carried by the frame, and power transmitting connections between the driving shaft and the said rolls.

2. A machine of the kind described, comprising a frame traction wheels for the frame, a pair of gathering rolls arranged longitudinally of the frame and having hook shaped knives projecting from their surfaces, a gearing to rotate said rolls in opposite directions, a driving shaft carried by the machine frame, power transmitting connections between the said shaft and the said gearing, a central member carried by the frame, knives projecting from said central member at positions alternate to the positions of the knives carried by the rolls.

3. A machine of the kind described, comprising a frame, a pair of gathering rolls supported by the frame and having knives projecting from their surfaces, a central member carried by the frame, knives projecting from said central member at positions alternate to the positions of the knives carried by the rolls, and means to rotate said rolls in opposite directions.

4. A machine of the kind described, comprising a transversely jointed frame supported on a front and rear axle, traction wheels for said axles, gathering rolls arranged longitudinally and journaled in the frontal portion of said frame, a central member carried by the frame and between the rolls, knives on the opposite sides of said central member arranged at position to permit of the passing of the knives carried by the gathering rolls, gearing for the gathering rolls to rotate same in opposite directions, driving means carried by the frame, power transmitting connections between the driving means and the said gearing, and means carried by the frame operable to raise and lower the frontal portion of the frame.

5. In a machine of the kind described, the combination with a pair of gathering rolls having peripheral hook shaped knives and adapted to be rotated in opposite directions, of a support member retained at a position intermediate the gathering rolls, and knives projecting in opposite directions from said support member to alternate with the positions of the knives carried by the gathering rolls.

In testimony whereof we affix our signatures.

FREDERICK STIFFLER.
COLUMBUS STIFFLER.